United States Patent [19]

Hogg et al.

[11] 4,264,014
[45] Apr. 28, 1981

[54] LOCK OUT MEANS FOR PIVOTAL AXLE SUSPENSION CYLINDERS

[75] Inventors: Theodore B. Hogg, Aurora; Lawrance F. Berg, Lockport, both of Ill.

[73] Assignee: Caterpillar Tractor Co., Peoria, Ill.

[21] Appl. No.: 958,301

[22] Filed: Nov. 6, 1978

[51] Int. Cl.³ .......................................... B66C 23/62
[52] U.S. Cl. .................................. 212/153; 280/754; 280/755; 212/189
[58] Field of Search ............... 280/702, 754, 755, 763, 280/766; 212/145, 39 R

[56] References Cited

U.S. PATENT DOCUMENTS

| | | | |
|---|---|---|---|
| 3,106,410 | 10/1963 | Walter | 212/145 |
| 3,687,227 | 8/1972 | Reuter et al. | 280/766 |
| 3,834,731 | 9/1974 | Uehara | 280/766 |

FOREIGN PATENT DOCUMENTS

| | | | |
|---|---|---|---|
| 1190625 | 4/1965 | Fed. Rep. of Germany | 212/39 R |
| 1265946 | 4/1968 | Fed. Rep. of Germany | 212/39 R |
| 794859 | 5/1958 | United Kingdom | 212/145 |
| 1090674 | 11/1967 | United Kingdom | 212/145 |

*Primary Examiner*—John J. Love
*Assistant Examiner*—Ross Weaver
*Attorney, Agent, or Firm*—Phillips, Moore, Weissenberger, Lempio & Majestic

[57] ABSTRACT

A crane comprises a lower frame having an upper frame rotatably mounted thereon. A pair of rear roadwheels are rotatably mounted on either end of an axle housing pivotally mounted on the lower frame and suspended thereunder by a pair of laterally spaced suspension cylinders. A boom, pivotally mounted on the upper frame, is adapted to be lowered and positioned forwardly of the crane when it is driven to a remote job site. During such forward positioning of the boom, either when loaded or unloaded, a cam secured to the upper frame trips an air valve for opening a pair of slave valves to communicate hydraulic fluid between the head ends of the suspension cylinders to permit the axle to oscillate. When the crane is placed in operation and the upper frame is rotated on the lower frame, the cam will release the air valve which closes the slave valves to block communication of hydraulic fluid between the suspension cylinders whereby the axle is placed in a lock-out condition of operation. The rod ends of the suspension cylinders are preferably disposed in unattached relationship adjacent to the axle housing, but could be secured thereto.

10 Claims, 5 Drawing Figures

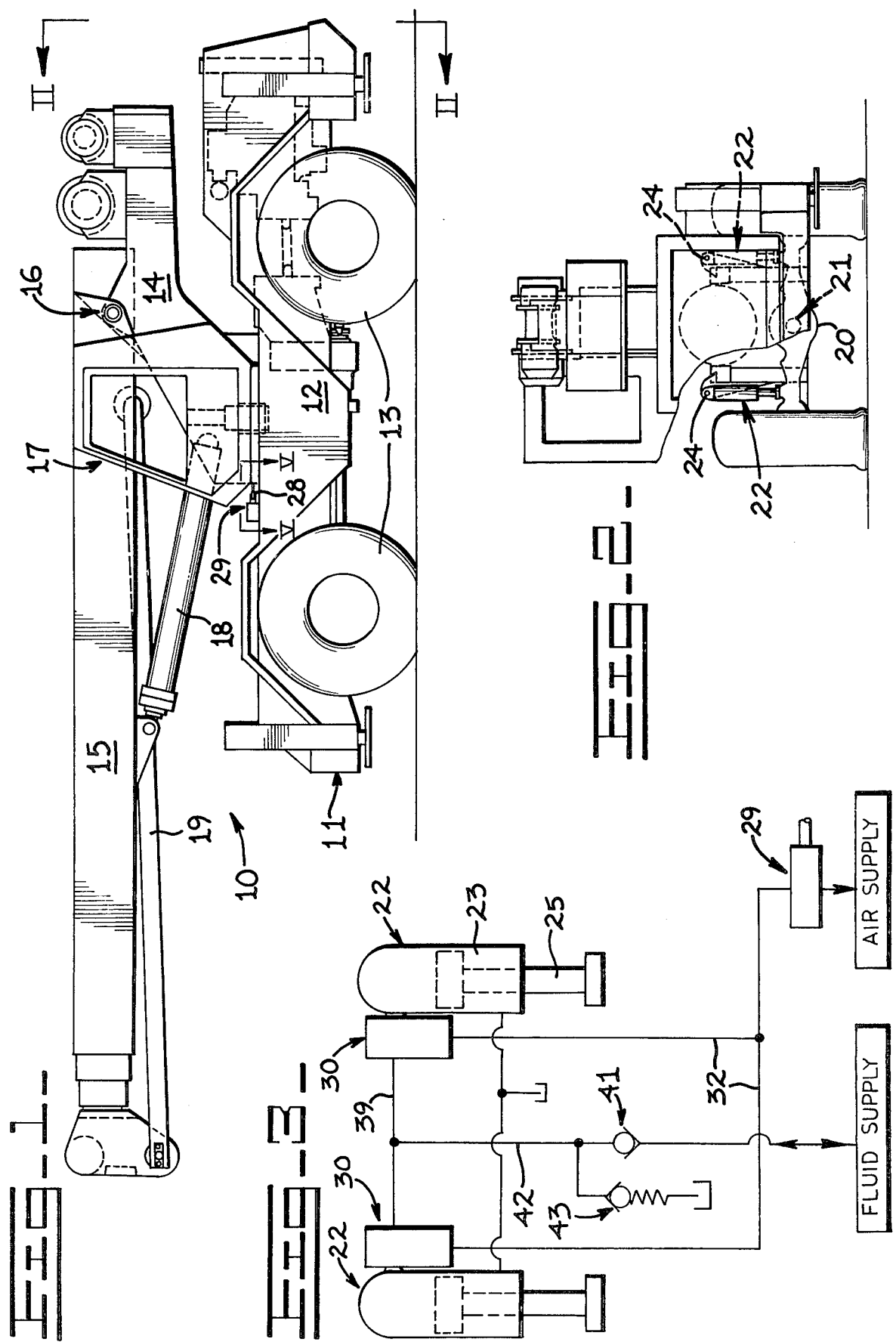

LOCK OUT MEANS FOR PIVOTAL AXLE SUSPENSION CYLINDERS

BACKGROUND OF THE INVENTION

Construction vehicles, such as cranes, excavators and the like, normally comprise an upper frame rotatably mounted on a lower frame and a boom pivotally mounted on the upper frame. Either the front or rear pairs of roadwheels are normally supported under the lower frame by a pair of laterally spaced suspension cylinders pivotally interconnected between an axle housing for each pair of roadwheels and the lower frame. When the vehicle is driven to a remote job site, it is desirable to place the suspension cylinders in a "roading" condition of operation whereby hydraulic fluid may be communicated therebetween to permit the axle housing to oscillate about a pivot means pivotally mounting the axle housing on the lower frame.

Upon the arrival at such job site and during performance of work thereat, it is further desirable to lock-out the performance of work thereat, it is further desirable to lock-out the suspension cylinders to stabilize the vehicle, except when the boom is positioned straight-forward. Conventional lock-out systems of this type normally comprise a separate control valve or in some cases a fluid circuit responsive to activation of the drive motor for the roadwheels which functions to release the cylinders from the lock-out condition of operation and thus place them in the "roading" condition of operation whereby the axle housing is permitted to oscillate for smooth driving purposes. Since the rod end of each suspension cylinder is pivotally connected to the axle housing, an operator cannot detect whether or not the suspension cylinders have been placed in such a "roading" condition of operation.

SUMMARY OF THIS INVENTION

An object of this invention is to provide a vehicle with an economical and non-complex lock-out means for selectively communicating or blocking communication of fluid between a pair of suspension cylinders of the vehicle. The vehicle comprises an upper frame rotatably mounted on a lower frame and an axle housing connected to the lower frame by the suspension cylinders. The axle housing is pivotally mounted on the lower frame by a centrally disposed pivot means and the laterally spaced suspension cylinders are disposed on either side of the pivot means.

The primary purpose of this invention is to provide lock-out means to lock-out axle oscillation at the suspension cylinders so that a line failure, if any, will not cause a loss of oil and resulting instability to the vehicle. In the preferred embodiment of this invention, the lock-out means comprises a cam secured to the upper frame for tripping an air valve which, in turn, opens a slave valve for communicating hydraulic fluid between the suspension cylinders to permit oscillation of the axle housing.

BRIEF DESCRIPTION OF THE DRAWINGS

Other objects of this invention will become apparent from the following description and accompanying drawings wherein:

FIG. 1 is a side elevational view of a crane having the lock-out means of this invention employed thereon;

FIG. 2 is a rear elevational view of the crane, taken in the direction of arrows II-II in FIG. 1, to illustrate the disposition of a pair of suspension cylinders and an axle housing on the crane;

FIG. 3 schematically illustrates a circuit employed in the lock-out means and operatively associated with the suspension cylinders;

DETAILED DESCRIPTION

Figure 4:
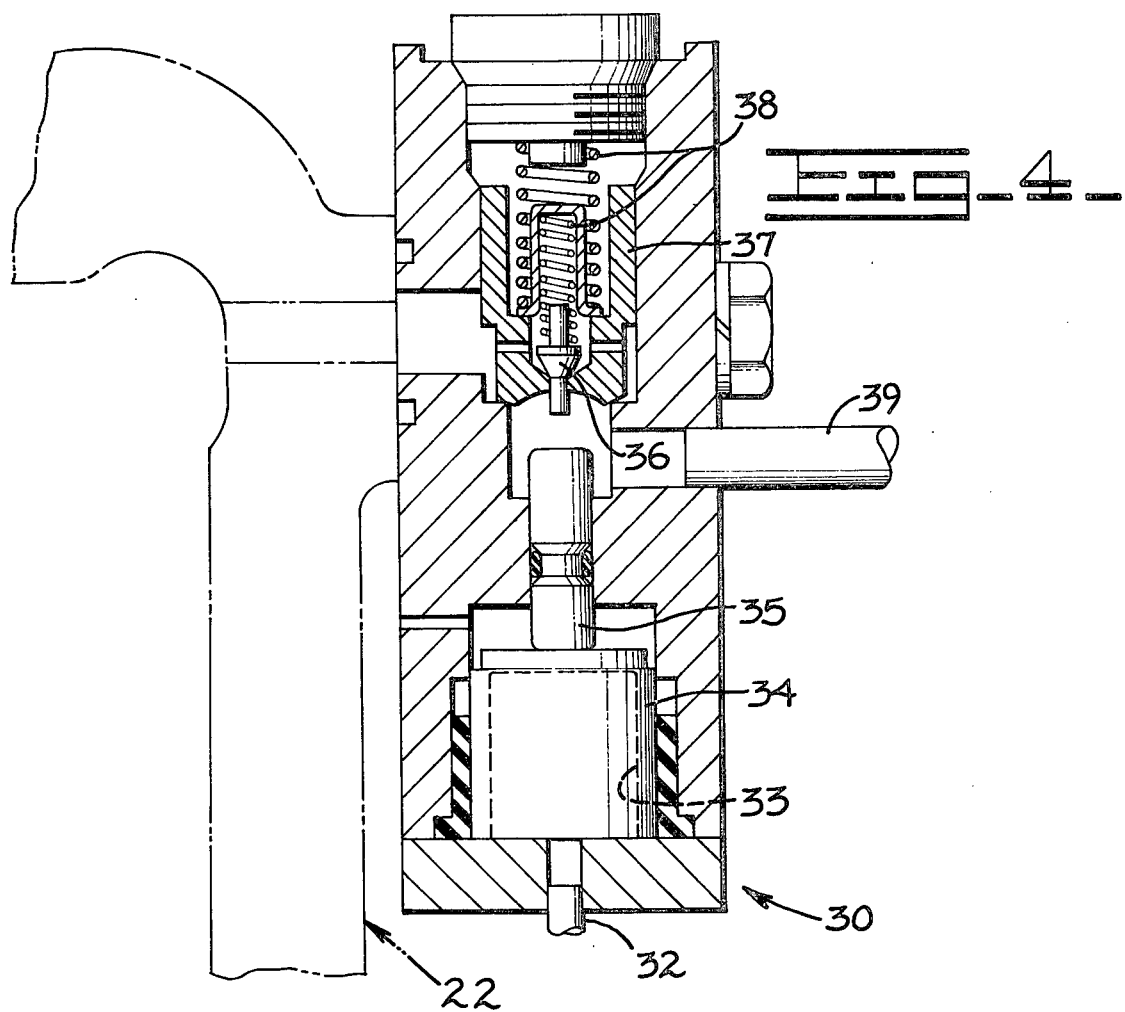
FIG. 4 is an enlarged, sectional view of a pilot operated slave valve employed in the circuit of FIG. 3.

FIGS. 1 and 2 illustrate a crane 10 comprising a mobile vehicle 11, such as a wheel-type tractor, comprising a lower frame or undercarriage 12 mounted on four roadwheels 13. An upper frame or turntable 14 is mounted in a conventional manner on the lower frame for rotational movements thereon via a conventional swing gear mechanism (not shown). A rearward end of a boom 15 is pivotally mounted at 16 on the upper frame, rearwardly of an operator's station 17 which is mounted on the upper frame in offset relationship relative to the boom.

Actuating means for selectively raising and lowering the boom relative to ground level may comprise a single double-acting hydraulic cylinder 18 pivotally interconnected between the upper frame and the boom. A jib 19 has its rearward end pivotally mounted on a forward end of the boom and is adapted to be placed in the illustrated stored position adjacent to the boom when the crane is driven to a remote job site or the like. Upon such driving, it is desirable to place the rear roadwheels 13 in an oscillating condition of operation to improve the ride characteristics of the vehicle. The rear wheels are allowed to oscillate because the center of gravity of the machine is forward of the center of the machine when it uses a heavy boom or is carrying a load.

As illustrated in FIGS. 2 and 3, the rear roadwheels are rotatably mounted on the opposite ends of an axle housing 20. The axle housing is pivotally mounted on the lower frame intermediate its ends by a standard pivot means or axle assembly 21. A pair of substantially identical suspension cylinders 22 are spaced laterally on either side of the pivot means and are disposed in suspending relationship between lower frame 12 and axle housing 20.

An upper end of a housing 23 of each cylinder is secured to the lower frame by bolts 24. A piston rod 25 is reciprocally mounted in the housing in a conventional manner and may have its lower end disposed in unattached relationship adjacent to the axle housing. Alternatively, the lower end of the rod may be suitably attached to the axle housing.

Figure 5:
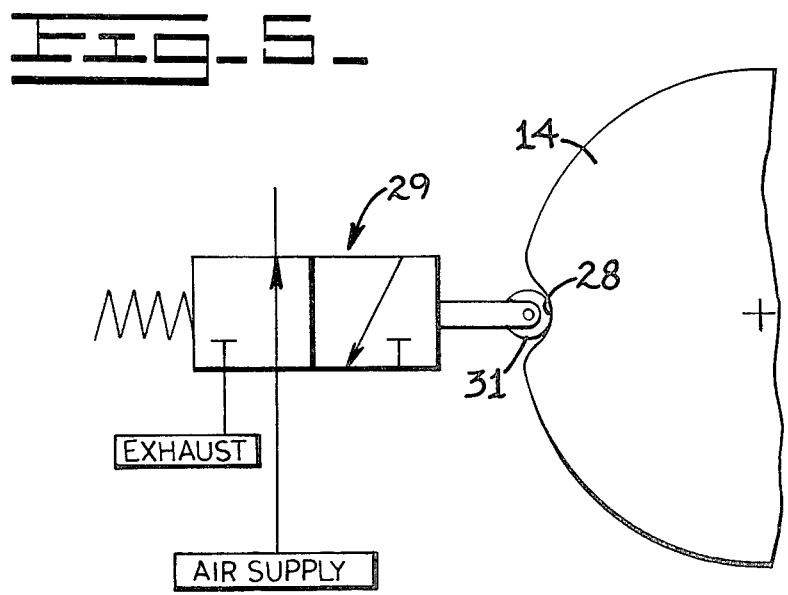
FIG. 5 schematically illustrates an air valve and cam employed in the lock-out means.

FIGS. 3-5 illustrate lock-out or control means associated with suspension cylinders 22 and responsive to rotation of upper frame 14 on lower frame 12 for communicating hydraulic fluid between the head ends of the suspension cylinders when the upper frame is maintained in a preselective rotative position on the lower frame. Communicating of fluid between the cylinders is blocked when the upper frame is maintained at any other rotative position on the lower frame to insure that any possible line failure will not cause a loss of oil and resulting instability to the vehicle. In the embodiment illustrated, when boom 15 is maintained in its straight-ahead position on the crane for driving purposes hydraulic fluid communicates between the cylinders to permit axle housing 20 to oscillate.

In such position of the boom, a depression 28 on the upper frame or a member attached thereto will actuate a plunger to open a two-position, three-way air valve or first valve means 29. In turn, the air valve functions to open a pilot-operated slave valve or second valve means 30 operatively connected to the head end of each suspension cylinder 22 to communicate hydraulic fluid between the cylinders for conditioning thereof to permit oscillation of axle 20 about pivot means 21 (FIG. 2). As further shown in FIG. 5, when upper frame 14 of the crane is rotated to disengage a roller 31 of spring-biased air valve 29 from depression 28, the spool of the valve will move to a second position to exhaust air from valves 30 to thus block communication of hydraulic fluid between the suspension cylinders. The above arrangement assures that the axle will remain in its locked condition of operation should the valve spool stick and fail to extend.

The air valve is connected to valves 30 by lines 32 to selectively communicate pressurized air to a chamber 33 defined in a piston 34 reciprocally mounted in each valve 30. Pressurization of chamber 33 will move the piston upwardly in FIG. 4 to, in turn, move a slug 35 upwardly. Upward movement of the slug will unseat a poppet 36 which is normally spring-biased, onto a seat defined in a check valve 37, by coil springs 38.

Valve 37 will thus open to allow free flow of hydraulic fluid between suspension cylinders 22 via a first cross-over line 39. Cross-over line 39 is interconnected between the head ends of the cylinders whereas a second cross-over line 40 is interconnected between the rod ends of the cylinders to exhaust any hydraulic fluid therefrom.

Should additional hydraulic fluid be required in cylinders 22, due to leakage or the like, a check or makeup valve 41 will open to communicate hydraulic fluid from a standard pressurized fluid supply thereto, via a line 42. Check valve 41 is shunted by a spring-biased relief valve 43, connected to line 42 on either side of valve 41, to relieve any excess pressures which may be prevalent in line 39, i.e., if one cylinder moves upwardly more than the other goes down or expansion occurs due to a temperature rise in the hydraulic system. When the cylinders are placed in communication by line 39, they will synchronize to permit rods 25 thereof to alternately extend and retract in a conventional manner to permit oscillation of the axle housing about pivot means 21. Since there is no physical connection between the axle housing and the cylinders, operator feel or a simple visual inspection during "roading" will generally indicate whether or not the cylinders are operating correctly.

As stated above, movement of air valve 29 to its second or closed position from its open position illustrated in FIG. 5 will vent pressurized air from chamber 33 (FIG. 4) through the air valve. Such opening of the air valve is in direct response to rotation of upper frame 14 wherein roller 31 is disengaged from depression 28. Poppet valve 36 will thus close under the biasing forces of spring 38 to, in turn, close check valve 37 whereby communication of hydraulic fluid between the suspension cylinders via line 39 is blocked.

The embodiments of the invention in which an exclusive property or privilege is claimed are defined as follows:

1. A mobile vehicle (11) comprising
a lower frame (12),
an upper frame (14) rotatably mounted on said lower frame,
an axle housing (20),
pivot means (21) for pivotally mounting said axle housing on said lower frame,
a pair of suspension cylinders (22) each disposed in suspending relationship between said lower frame and said axle housing and spaced laterally on either side of said pivot means, and
lock-out means responsive to rotation of said upper frame on said lower frame for communicating fluid between said suspension cylinders when said upper frame is maintained at a preselected rotative position on said lower frame and for blocking communication of fluid between said suspension cylinders when said upper frame is maintained at other rotative positions on said lower frame,
said lock-out means comprising a cam secured on said upper frame, a first valve means having a plunger thereof disposed adjacent to said upper frame and engageable with said cam when said upper frame is maintained at said selected rotative position on said lower frame, and second valve means slaved to said first valve means for opening to communicate fluid between said suspension cylinders when said first valve means is actuated, said first valve comprising a two-position, three-way air valve movable between a first position for communicating a pressurized air supply to said second valve means and a second position for blocking communication of said pressurized air supply to said second valve means and for simultaneously exhausting air from said second valve means, a said second valve means communicating with each of said suspension cylinders and wherein said second valve means comprises a piston reciprocally mounted in a housing thereof to define a closed chamber therein communicating with said air valve, a slug reciprocally mounted in said housing and engageable with said piston, and poppet valve means movably mounted in said housing and openable by said slug.

2. The vehicle of claim 1 further comprising a boom pivotally mounted on said upper frame and disposed forwardly of said vehicle when said upper frame is maintained at said preselected rotative position on said lower frame.

3. The vehicle of claim 1 wherein each of said suspension cylinders comprises a housing having its upper end connected to said lower frame and a rod reciprocally mounted in said housing, a lower end of said rod disposed in unattached relationship adjacent to said axle housing.

4. The vehicle of claim 1 wherein said cam has a depression formed therein adapted to receive said plunger when said upper frame is maintained at said selected rotative position on said lower frame.

5. The vehicle of claim 1 further comprising makeup valve means connected between a cross-over line interconnected between said second valve means and a pressurized hydraulic fluid supply and openable for communicating pressurized hydraulic fluid to said cross-over line when the pressure therein falls below a predetermined level.

6. The vehicle of claim 5 further comprising relief valve means shunted around said makeup valve means for venting hydraulic fluid from said cross-over line to a reservoir of said fluid supply directly when fluid pressure in said cross-over line exceeds a predetermined level.

7. A mobile vehicle comprising
a frame,
a turntable rotatably mounted on said frame,
a boom pivotally mounted on said turntable and adapted to be disposed forwardly of said vehicle when said turntable is maintained at a preselected rotative position on said frame,
pivot means pivotally mounting said axle housing on said frame,
a pair of suspension cylinders spaced laterally on either side of said pivot means, each of said suspension cylinders comprising a housing having its upper end connected to said frame and a rod reciprocally mounted in said housing and having its lower end disposed in unattached relationship adjacent to said axle housing, and
lock-out means for either (1) communicating fluid between said suspension cylinders or (2) blocking communication of fluid between said cylinders whereby either condition (1) or (2), above, can be detected by an operator of said vehicle,
said lock-out means comprising a cam secured on said turntable, a first valve means having a plunger thereof disposed adjacent to said turntable and engageable with said cam when said turntable is maintained at said selected rotative position on said frame, and second valve means slaved to said first valve means for opening to communicate fluid between said suspension cylinders when said first valve means is actuated, said first valve means comprising a two-position, three-way air valve movable between a first position for communicating a pressurized air supply to said second valve means and a second position for blocking communication of said pressurized air supply to said second valve means and for simultaneously exhausting air from said second valve means, a said second valve means communicating with each of said suspension cylinders and wherein said second valve means comprises a piston reciprocally mounted in a housing thereof to define a closed chamber therein communicating with said air valve, a slug reciprocally mounted in said housing and engageable with said piston, and poppet valve means movably mounted in said housing and openable by said slug.

8. The vehicle of claim 7 wherein said cam has a depression formed thereon adapted to receive said plunger when said turntable is maintained at said selective rotative position on said frame.

9. The vehicle of claim 7 further comprising makeup valve means connected between a cross-over line interconnected between said second valve means and a pressurized hydraulic fluid supply and openable for communicating pressurized hydraulic fluid to said cross-over line when the pressure therein falls below a predetermined level.

10. The vehicle of claim 9 further comprising relief valve means shunted around said makeup valve means for venting hydraulic fluid from said cross-over line to a reservoir of said fluid supply directly when fluid pressure in said cross-over line exceeds a predetermined level.

* * * * *